US012675671B2

(12) United States Patent
Thewes et al.

(10) Patent No.: US 12,675,671 B2
(45) Date of Patent: Jul. 7, 2026

(54) ARTIFICIAL INTELLIGENCE-BASED ANOMALY DETECTION AND PREDICTION

(71) Applicant: ZF Friedrichshafen AG, Friedrichshafen (DE)

(72) Inventors: Nicolas Thewes, Saarbrücken (DE); Georg Schneider, Urbar (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 732 days.

(21) Appl. No.: 18/297,493

(22) Filed: Apr. 7, 2023

(65) Prior Publication Data

US 2023/0325640 A1      Oct. 12, 2023

(30) Foreign Application Priority Data

Apr. 7, 2022    (DE) .......................... 102022203475.9

(51) Int. Cl.
G06N 3/04          (2023.01)
G06N 3/0455        (2023.01)
          (Continued)

(52) U.S. Cl.
CPC .......... G06N 3/0455 (2023.01); G06N 3/084 (2013.01)

(58) Field of Classification Search
CPC ............ G06N 3/084; G06N 3/09; G06N 3/08; G06N 3/0895; G06N 3/091; G06N 3/092;
          (Continued)

(56) References Cited

U.S. PATENT DOCUMENTS 4,839,853 A      6/1989  Deerwester et al.
11,137,322 B2 *  10/2021  Jung ...................... G06N 3/045
          (Continued)

FOREIGN PATENT DOCUMENTS

CN          111860565 A      10/2020
DE    10 2019 110 721 A1    10/2020
          (Continued)

OTHER PUBLICATIONS

Hanjun Kim, "Machine Anomaly Detection Using Sound Spectrogram Image and Neural Networks", Aug. 2019, pp. 1-67 (Year: 2019).*

(Continued)

*Primary Examiner* — Paulinho E Smith
(74) *Attorney, Agent, or Firm* — Crowell & Moring LLP

(57)          ABSTRACT

A system for rendering an explanation output for users regarding an anomaly predicted by an anomaly detection module on the basis of high frequency sensor data or values derived therefrom in an industrial production process, wherein the anomaly detection module predicts the anomalies when the anomaly detection module classifies sensor data or ranges of sensor data that describe a state of a machine, a component, and/or a product of the production process as different from the data that are normally expected, wherein the system is configured to send an optimized explanation mask as a rendering of the explanation output for a user, wherein the user can identify which sensor data, ranges of sensor data, or values derived therefrom are responsible for the anomaly predicted by the anomaly detection module based on the optimized explanation mask.

11 Claims, 7 Drawing Sheets

(51) Int. Cl.
*G06N 3/08* (2023.01)
*G06N 3/084* (2023.01)

(58) Field of Classification Search
CPC ........ G06N 3/094; G06N 3/096; G06N 3/098;
G06N 3/0985
See application file for complete search history.

(56) References Cited

U.S. PATENT DOCUMENTS

| | | | | |
|---|---|---|---|---|
| 11,775,829 B2 * | 10/2023 | Karras | ................... | G06N 3/094 |
| | | | | 706/20 |
| 11,893,085 B2 * | 2/2024 | Pandey | ................ | G06N 3/0464 |
| 12,266,161 B2 * | 4/2025 | Khoreva | ............. | G06N 3/0475 |
| 2017/0289409 A1 * | 10/2017 | Min | ........................ | G06N 3/084 |
| 2019/0197236 A1 * | 6/2019 | Niculescu-Mizil | .......................... | |
| | | | | H04L 63/1425 |
| 2020/0012904 A1 * | 1/2020 | Zhao | .................... | G06N 3/0455 |
| 2020/0012943 A1 * | 1/2020 | Neves | ...................... | G06N 3/08 |
| 2020/0202507 A1 * | 6/2020 | Ceccaldi | ................ | G06N 3/006 |
| 2020/0393329 A1 * | 12/2020 | Jung | .................... | G06N 3/0464 |
| 2021/0142177 A1 * | 5/2021 | Mallya | ................... | G06N 3/082 |
| 2021/0232865 A1 * | 7/2021 | Munoz Delgado | .. | G06N 3/0464 |
| 2022/0067983 A1 * | 3/2022 | Fidler | ................... | G06V 20/58 |
| 2022/0383128 A1 * | 12/2022 | Gonzales | ................ | G06T 7/001 |
| 2023/0013544 A1 * | 1/2023 | Schlegel | .............. | G07C 5/0808 |
| 2023/0214643 A1 * | 7/2023 | Baptista De Souza | ...................... | |
| | | | | G06F 17/16 |
| | | | | 706/25 |
| 2023/0274757 A1 * | 8/2023 | Oku | ........................ | G10L 25/30 |
| | | | | 702/39 |
| 2023/0325640 A1 * | 10/2023 | Thewes | ................ | G06N 3/0455 |
| | | | | 706/21 |

FOREIGN PATENT DOCUMENTS

| | | | |
|---|---|---|---|
| DE | 10 2019 217 613 A1 | 12/2020 | |
| DE | 20 2021 101 570 U1 | 5/2021 | |
| DE | 10 2019 135 608 A1 | 6/2021 | |
| DE | 10 2020 201 742 A1 | 8/2021 | |
| DE | 102021210106 A1 | 3/2023 | |
| DE | 102021210107 A1 | 3/2023 | |

OTHER PUBLICATIONS

Wichern et al., "Anomalous Sound Detection using Attentive Neural Processes", Oct. 20, 2021, 2021 IEEE Workshop on Applications of Signal Processing to Audio and Acoustics, pp. 1-5. (Year: 2021).*

* cited by examiner

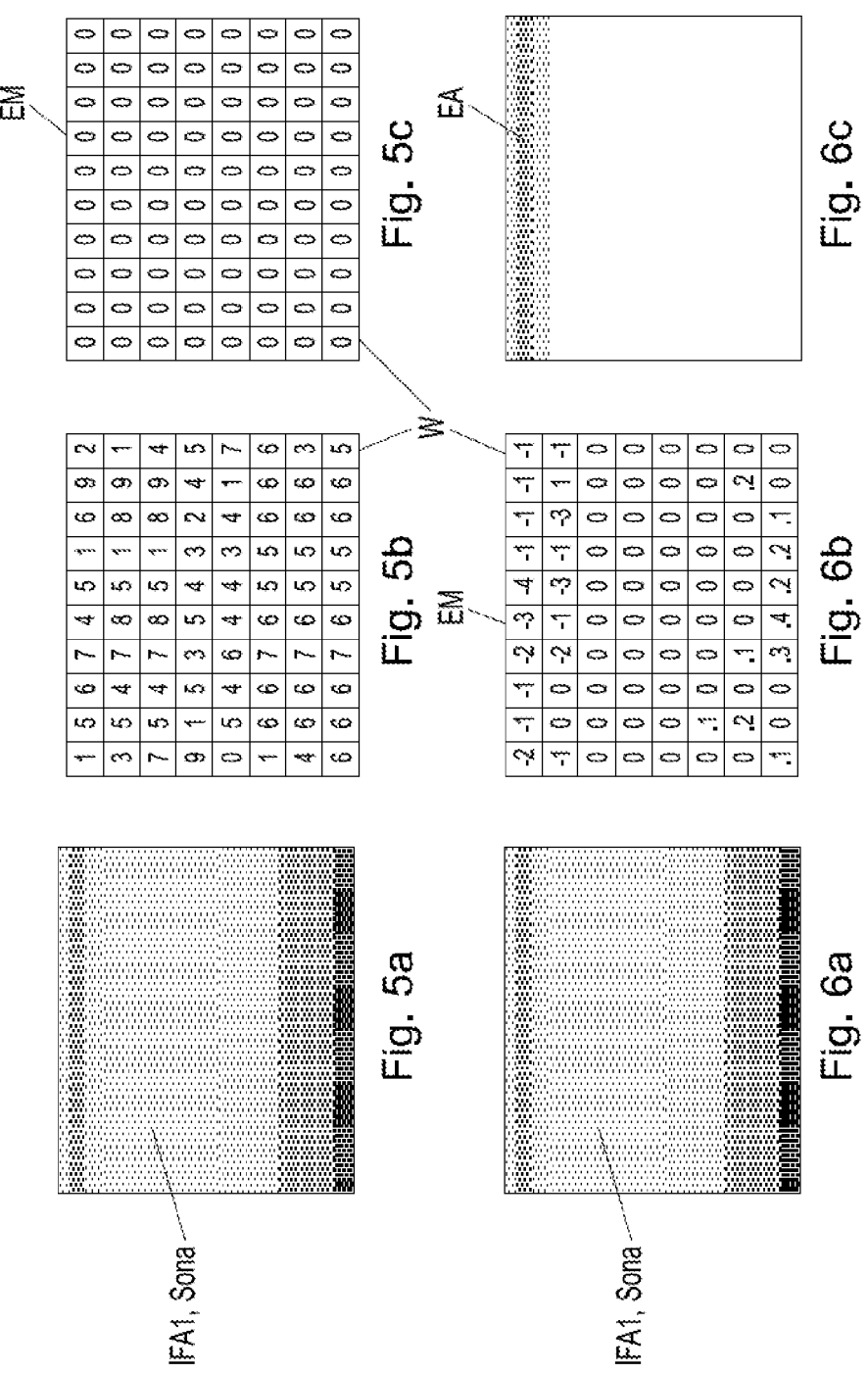

ARTIFICIAL INTELLIGENCE-BASED ANOMALY DETECTION AND PREDICTION

CROSS-REFERENCE TO RELATED APPLICATION

This application claims priority to German Application No. DE 10 2022 203 475.9, filed on Apr. 7, 2022, the entirety of which is hereby fully incorporated by reference herein.

BACKGROUND AND SUMMARY

The invention relates to a system for rendering an explanation output that explains an anomaly predicted by an anomaly detection module in high frequency sensor data or values derived therefrom in an industrial production process. The invention also relates to a method and a computer program for monitoring artificial intelligence-based anomaly detection in high frequency sensor data or values derived therefrom in an industrial production process. The invention further relates to a method and a computer program for monitoring artificial intelligence-based anomaly detection in a final acoustic testing of a transmission at the end of the assembly line.

The following definitions, descriptions and explanations retain their respective meanings throughout the description of the invention disclosed herein, and can be applied to all of the subject matter of the disclosed invention.

Industrial production processes are varied and complex processes that are prone to error and malfunctions. The processes and/or individual steps thereof comprise prototype processes, shaping processes, separating processes, joining processes, coating processes, and/or material property altering processes according to DIN 8580. By way of example, final transmission test for a transmission, e.g. a vehicle transmission, or a transmission for a wind turbine, comprising a functional and/or acoustic testing of the transmission, is an industrial production process. In the so-called $4^{th}$ industrial revolution, more sensors were incorporated in the production processes, such that the processes can now be fully charted using data.

Ensuring that an industrial process step is carried out correctly requires a lot of effort and is expensive, because errors are frequently identified and eliminated manually, and after the fact. The German patent application with the file number 102021210107.0 discloses computerized methods, modules, and a system for identifying anomalies in industrial production processes with which industrial production processes and/or individual steps in an industrial production process can be monitored in order to better detect disruptions or anomalies. The system disclosed therein for identifying anomalies is an overall system in which analysis models, also referred to as anomaly detection models, are created. The anomaly detection models evaluate a state on the basis of data, and calculate an anomaly value. The anomaly value illustrates the degree of the anomaly, as is explained in the German patent application with the file number 102021210106.2. Anomalies in industrial production processes are thus determined on the basis of data, in particular through ordered, numerical data, e.g. in the form of a spectrogram. The anomaly detection algorithms, anomaly detection modules, and the anomaly detection system disclosed therein belong to the contents of this disclosure through the explicit reference thereto.

Machine learning algorithms can be used as the basis for the anomaly detection analysis models. Logistic regression is just one example of an analysis model. Other analysis models comprise isolation forests, autoencoders, generative adversarial networks, convolutional neural networks, or support vector machines, for example. An isolation forest is an anomaly detection algorithm that identifies anomalies through isolation. These anomalies are isolated with binary trees. An isolation forest functions well in situations in which there are no, or few, anomalies in the training data set. An isolation forest is therefore an advantageous analysis model.

The German patent application with the file number 102021210106.2 discloses a computerized method and a system for anomaly detection and a method for anomaly detection in a final acoustic testing of a transmission with which a degree of a state anomaly can be charted on the basis of state data. The anomaly detection models and method for calculating the anomaly value disclosed therein belong to the contents of this disclosure through the explicit reference thereto.

A type of data frequently encountered in industrial production processes is high frequency data, i.e. data recorded at a high sampling rate with sensors, e.g. temperature sensors, vibration sensors, force sensors, pressure sensors, acoustic sensors, measuring sensors, current sensors, and/or voltage sensors. The sampling rate depends on the respective application. By way of example, frequencies greater than 20 kHz are regarded as high frequency in the audible range, and those greater than 9 kHz are regarded as high frequency in electrotechnology, while frequencies higher than 1 kHz are already regarded as high frequency in medical applications. All of these data that are recorded at high frequencies differ from other data in terms of their processing. One reason for this is the number of data points, while another reason is the significance of the frequencies in the data that are to be analyzed. With high frequency data, the frequency spectrum is often analyzed, e.g. using Fourier transforms.

One of the most fundamental objectives is the detection of anomalies in a production process, production step, or when inspecting components and/or products on the basis of these data, preferably using artificial intelligence algorithms. For these detections to be reliable and a user to gain confidence therein, the anomalies detected with algorithms must at least in part be supervised and evaluated by a user. User supervision prevents or minimizes safety risks. User evaluation is difficult when artificial intelligence algorithms are used due to the complexity of the results. With more complex data, e.g. high frequency data, the difficulties increase.

Artificial intelligence comprises machine learning. Machine learning is a form of technology with which computers and other data processing devices are taught to execute tasks by learning from data, instead of being programmed for such. Examples of machine learning algorithms are artificial neural networks, convolutional neural networks, support vector machines and random forest models. The objective of an artificial intelligence algorithm in general is to render data from potentially concealed information such that it can be made use of. One example of this is the classification of data sets into categories. Previously established categories can be used for this, such as when classifying images of animals into categories relating to animal species. In other cases, the categories may be more general, as is the case in the anomaly detection to which this invention relates, in which only one category has been established (normal), and the objective is to detect examples of data deviating therefrom (abnormal).

An object of the invention is to render the outputs of an artificial intelligence algorithm such that a user can understand why the algorithm has made a specific assumption or classification, in particular by rendering an explanation output relating to the results of an algorithm for high frequency data that have been processed, in particular when classifying data sets obtained with sensors from industrial production processes, as either normal or abnormal data, such that a user can understand the results.

The subject matter of the present disclosure solves these problems. Advantageous embodiments of the invention can be derived from the definitions, drawings, and the descriptions of preferred exemplary embodiments.

According to one aspect, a system is obtained with which an explanation output can be rendered for users that relates to an anomaly predicted by an anomaly detection module in high frequency sensor data or values derived therefrom in an industrial production process. The anomaly detection module predicts the anomalies if the anomaly detection module classifies the sensor data or a range of sensor data describing the state of a machine, component, and/or product of the production process as differing from data that is normally expected. The system is configured to create a machine learning model on the basis of sensor data or ranges of sensor data processed by the anomaly detection module, which the anomaly detection module uses on the sensor data or ranges of sensor data, and generate an explanation for the predicted anomalies on the basis of the anomalies predicted by the machine learning model;

create an explanation mask for calculating the explanation, which alters the sensor data or ranges of sensor data for which the anomaly has been predicted such that the anomaly detection module classifies the sensor data masked by the explanation mask as normal;

optimize values of the explanation mask to the respective masked sensor data with iterative processes in the machine learning model;

transmit the optimized explanation mask in the form of explanation output that is rendered such that a user can see, based on the optimized explanation mask, which sensor data, ranges of sensor data, or values derived therefrom are responsible for the anomalies predicted by the anomaly detection module.

The system can be abbreviated as HF-xAI. "HF" refers to the high frequency sensor data. "x" refers to the data and also indicates that they can be explained through artificial intelligence; in the latter context, "x" is an abbreviation for "explainable." "AI" stands for artificial intelligence, and indicates that anomalies are predicted using artificial intelligence.

The anomaly detection module is disclosed, for example, in the German patent application with the file no. 10 2021 210 107.0, and herein in FIG. 2 as an exemplary embodiment of the anomaly detection module, labelled IF-Anom.

The sensor data are obtained from sensors. The term "sensor" comprises both actual sensors and sensor models. Sensor models simulate actual sensors. The sensors can be temperature sensors, vibration sensors, force and pressure sensors, optical sensors, e.g. cameras, infrared sensors, lidar sensors, radar sensors, current sensors, voltage sensors, and/or sensors for measuring the size of a component. The sensors or sensor models are technological components. The sensors that are used in a specific case may depend on the respective process step. According to one aspect of the invention, the functions of a machine, as well as the properties of a component, are monitored by sensors, comprising the aforementioned sensors. According to one aspect of the invention, the following sensor configurations are used:

sensor measurements relating to components: shape, appearance;

measurements relating to machines: vibrations and temperatures of one or more components;

sensors for component testing: noise, vibration, amperage, pressure.

According to one aspect of the invention, the sensors transmit the sensor data to one another and/or to individual components/modules in the invention and/or to a cloud infrastructure by means of Internet of Things technology. This results in an automated or autonomous anomaly detection. The cloud infrastructure comprises a cloud-based data storage unit. The cloud infrastructure can be a public, private, or hybrid cloud structure.

One example of a value derived from sensor data is a spectrogram. One example of this is the conversion of a time signal recorded by a sensor into a frequency domain using a fast Fourier transform. In the spectrogram, an entry corresponds to the amplitude or energy of a frequency in a time interval, such that a matrix of numerical values is obtained in which each column corresponds to a time interval, and each line corresponds to a frequency. The spectrogram is normally a two dimensional matrix with a time axis and a frequency axis. The entries in a spectrogram are organized in this manner.

In the case of a spectrogram, the explanation mask is normally a two dimensional matrix. The explanation mask is used to alter the original sensor data or original sensor spectrogram such that the machine learning model in the anomaly detection module will regard the data set in question as normal. This approach is based on the scenario described as a targeted adversarial attack. The individual values in the explanation mask are altered such that the machine learning model in the anomaly detection module no longer regards the raw data set as abnormal. The explanation mask then forms the explanation in which it maps alterations that are necessary for turning the raw data from abnormal into normal data.

The optimized explanation mask presents ranges of the high frequency sensor data or a spectrogram that are relevant in explaining an anomaly detection. The purpose of the system is to enable, improve, or make a rendering of the explanation output of the relevant range of values accessible to a user.

The system according to the invention can be a distributed system, e.g. a cloudified system. By way of example, the sensors can be located at different production stages in the industrial production process, and the anomaly detection module and the calculation of the explanation outputs can be located in the cloud. The anomaly detection is then formed by software in the cloud infrastructure. In another example, the sensors and the anomaly detection module are located in the industrial production process, and the explanation output is calculated in the cloud. That it is based on sensor data, the machine learning model, and the predicted anomalies, means in this context that an evaluation module in the cloud acquires the sensor data, the machine learning model and the predicted anomalies from the anomaly detection module via transceiver units.

The modules comprise hardware and/or software modules. The hardware modules comprise electronic units, integrated circuits, embedded systems, microcontrollers, multiprocessor system on chips, central processing units, and/or hardware accelerators, e.g. graphics processing units, data storage units, and connectivity elements, e.g. WLAN modules, RFID modules, Bluetooth modules, or NFC modules.

The definition of an anomaly can be based on the definition of what is understood to be a state in an industrial production process. A state describes the qualities and/or properties of a process, component, and/or (production) machine at a specific point in time or in a specific time interval. This state is detected through measurements made using the sensors described above. Which sensors are appropriate depends on the definition of the state and the system that is to be described (component, machine, etc.). Conversely, the sensors that are available also affect the definition of the state. A state that cannot be determined with the available sensors is not a useful definition of a state. A state in an industrial production process can have a variety of emphases, some of which are defined according to the invention as follows:

the state of a machine can be defined by the combination of all of the sensor data within a time interval, e.g. the last 10 seconds, as well as by component-specific parameters.

the state of a component can be defined by the results of a test as well as by other component parameters comprising different component variations.

An allocation of the states is determined on the basis of the respective state definitions. An anomaly is a state specified by corresponding sensor data that is both uncommon and differs from nearly all other states, based on the recorded data, e.g. a detected state characterized by vibrations recorded at a high frequency. An anomaly is rare and different. Nevertheless, it may often be difficult to distinguish between normal and abnormal, and it may not be possible to make a clear distinction with the available data, such that it may only be possible to determine that a state is abnormal with a certain level of probability. This is where a user inspection/evaluation becomes necessary.

The explanation output relates to the how artificial intelligence algorithms can be explained. This explanation output is generated as an additional output for a concrete classification of a data set in a category, e.g. abnormal, with which a user can then understand just why this classification was made. The system makes it possible to explain artificial intelligence algorithms applied to high frequency data. High frequency data are particularly challenging for humans, because normal experience, as is the case with images at normal frequencies and tabular data, does not apply. The system helps users to understand the decisions made by artificial intelligence algorithms based on the processing of high frequency data. This understanding applies to various situations that are of relevance in an industrial context, e.g.:

Justification: The explanation output provides a justification for the classification or the predicted anomaly. By this means, confidence can be gained in the use of automation based on artificial intelligence, and, if necessary, regulatory requirements can be satisfied.

Monitoring: Data sets used for training algorithms in the field of artificial intelligence are rarely perfect, for which reason it must be ensured that the aspects drawn on in such an algorithm for a decision relate to the problem and are therefore reliable. In this manner, it is ensured that the algorithm will provide useful results in cases with data differing from that used for the initial training and testing. In particular, approaches can also be improved if an algorithm delivers an incorrect result.

Improvement: As the system becomes easier to understand, it is easier to make further improvements. The clarity of artificial intelligence algorithms therefore plays a decisive role in its development and refinement.

Discovery: A decisive question after detecting anomalies in an industrial production process relates to what caused the anomaly and how can it be eliminated, referred to as "root cause analysis (RCA)." Sensor data that can be classified as abnormal may provide decisive information.

These aspects become increasingly relevant when the system is configured to react autonomously at times, as is normally the aim in industrial applications.

According to one aspect of the invention, the explanation output is sent to users via a user interface (UI) in the system. The system helps users check anomaly detection through the user interface.

The systems makes it possible for people to monitor the anomaly detection module. User supervision helps in preventing or minimizing safety risks that arise when errors occur in the anomaly detection module.

According to another aspect of the invention, anomalies are annotated in order to obtain a more detailed detection. According to one aspect of the invention, annotations can be subdivided into numerous levels (of detail), e.g. three. A first level comprises binary classification by the inspector, e.g. false-positive events. In the second level, the inspector can specify the component in question more precisely. In a third level, the inspector can implement more specific requirements regarding the inspection and results. In another aspect of the invention, the annotations are reported online in the form of a table or file.

Another aspect of the invention relates to a use of the system during the development of a model in an anomaly detection module.

Based on an explanation output from the system, it is ensured in a training process for the machine learning model that is used by the anomaly detection module that no false, random, or irrelevant aspects of training data are learned. This makes it possible to monitor data sets used for training artificial intelligence algorithms. This ensures that the aspects that are drawn on for decisions make sense and are reliable.

The system can also be used in the following scenarios:

Use in prototype anomaly detection: Gaining user confidence in that it is shown that the anomaly predictions are based on relevant aspects of the data;

Use with random samples: Checking the results of the anomaly detection to ensure the quality of the method and gain trust in the method.

The explanation outputs can also be stored with the results of the anomaly detection for later, deeper analyses, in order to satisfy potential regulatory requirements, e.g. regarding transparence. These requirements are stipulated, for example, in European laws on regulating artificial intelligence.

According to another aspect of the invention, a method is provided for monitoring artificial intelligence-based anomaly detection in high frequency sensor data or values derived therefrom in an industrial production process. The method comprises the following steps:

acquiring sensor data processed by an anomaly detection module, for which a machine learning model in the anomaly detection module has predicted an anomaly, obtaining the machine learning model, and receiving the predicted anomaly;

generating an explanation output for the predicted anomaly;

sending the explanation output to a user for evaluation;

user evaluation of the predicted anomaly as correct or incorrect on the basis of the explanation output;

sending the evaluation to a system, the anomaly detection module, and/or a respective production step to which it relates in the industrial production process through the user interface.

According to one aspect of the invention, the explanation output is generated using the system according to the invention.

According to another aspect of the invention, a method is provided for monitoring artificial intelligence-based anomaly detection in a final acoustic testing of a transmission at the end of an assembly line. The method comprises the following steps:

running the transmission with a rotational rate profile, measuring the resulting structure-borne sound with acoustic sensors, and obtaining a structure-borne sound time sequence;

transforming the structure-born sound time sequence into a frequency domain and obtaining a spectrogram;

classifying the spectrograms as normal and abnormal on the basis of predefined limit values for specific frequency ranges;

processing the spectrograms with an artificial neural network that is trained to predict anomalies in the spectrogram;

if the artificial neural network predicts an anomaly in a spectrogram classified as normal, generating an explanation output for the predicted anomaly;

showing a user the part of the spectrogram responsible for the predicted anomaly on the basis of the explanation output.

According to one aspect of the invention, the explanation output is generated by the system according to the invention.

The method according to the invention can be implemented on a computer.

According to another aspect of the invention, a computer program is provided for monitoring artificial intelligence-based anomaly detection in high frequency sensor data or values derived therefrom in an industrial production process. The computer program comprises commands with which the steps of the method for monitoring artificial intelligence-based anomaly detection in high frequency sensor data or values derived therefrom in an industrial production process are executed by a computer.

According to another aspect of the invention, a computer program is provided for monitoring artificial intelligence-based anomaly detection in a final acoustic testing of a transmission at the end of the assembly line. The computer program comprises commands with which the steps of the method for monitoring artificial intelligence-based anomaly detection in a final acoustic testing of a transmission are executed on a computer.

The commands in the computer program comprise machine commands, source code or object code written in assembly language, an object-oriented programming language, e.g. C++, or a procedural programing language, e.g. C. The computer programs are application programs that are hardware-independent according to one aspect of the invention, which can be provided, for example, via data carriers or data carrier signals transmitted via software over-the-air technologies.

According to another aspect of the invention, the system is configured to present the optimized explanation mask, a combination of initial sensor data or values derived therefrom and the optimized explanation mask, or to present the initial sensor data or values derived therefrom next to the optimized explanation mask, to a user in a graphic rendering. A combination comprises adding the optimized explanation mask to the initial/original sensor data, or multiplying the optimized explanation mask with the initial/original sensor data. An explanation mask with smaller dimensions than the initial sensor data can also be combined therewith. The explanation output is rendered graphically in this manner. When the initial sensor data or values derived therefrom and the optimized explanation output are presented next to one another, it is easier for the user to identify and evaluate the parts of the initial sensor data that are relevant to the decision.

According to one aspect of the invention, the system is configured to generate the explanation output in an audible form. The user can then hear differences in sounds and make an evaluation thereof.

According to another aspect of the invention, the system is configured to generate an output in the form of a report, in addition to the visible or audible outputs of the explanation. By way of example, a report belonging to a spectrogram-based explanation output explains in writing to what extent, which frequencies, and at which times the amplitudes/excitations were too high.

According to another aspect of the invention, the system is configured to optimize the values of the explanation mask under the boundary conditions, such that the changes to the initial sensor data or values derived therefrom are minimal;

the changes to the initial sensor data or values derived therefrom are focused on localized ranges of the sensor data;

the changes favor coherent ranges of sensor data or values derived therefrom over isolated sensor data; and/or the altered values lie within the range of observable values that are expected or physically possible.

The boundary conditions or restrictions contribute to the clarity of the output. By way of example, favoring coherent ranges facilitates interpretation. The boundary conditions can be incorporated in the optimization in the form of regularization terms. One aspect of the invention allows the user to configure the exact form and prioritization of the restrictions. The user can therefore select different configurations for calculating the explanation outputs and thus generate an explanation output in an iterative process that is tailored to a specific application. According to another aspect of the invention, the user can make a selection from a series of standard configurations that often obtain good results. Once a configuration has been modified, it can then be used as a standard for all subsequently detected anomalies. It is also possible to store numerous configurations, and select a configuration based on metadata relating to the example that is to be explained.

According to another aspect of the invention, the system is configured to distort initial sensor data or values derived therefrom and/or the explanation mask with random values. By way of example, the spectrogram altered by the explanation mask is distorted in each optimization cycle by random values. One way of doing this is to add a matrix of the same dimensions as an original spectrogram and composed of random values to the spectrogram and/or explanation mask. This type of distortion results in improved explanation masks, because this prevents the explanation mask from only tending toward apparently optimal values and/or local minimums. It has been shown that this improves the explanation outputs. The distortions with random values can affect the explanation results. The system starts with parameters that often obtain good results. The users of the system can then refine the parameters in an iterative approach in an application-specific manner.

According to another aspect of the invention, the explanation mask has the same dimensions as initial sensor data or values derived therefrom, and the system is configured to add the explanation mask to initial sensor data or values derived therefrom in an iterative manner, and/or multiply the explanation mask with initial sensor data or values derived therefrom in an iterative manner. If, for example, a spectrogram is derived from the initial sensor data in the form of a two dimensional matrix, the explanation mask will then be the same size as the spectrogram. Addition and multiplication can result in different explanation results. In this manner, the user can test different configurations.

According to another aspect of the invention, the explanation mask is initially smaller than initial sensor data or values derived therefrom, and the system is configured to create an explanation mask by means of upsampling, which then has the same dimensions as the initial sensor data or values derived therefrom. By way of example, a spectrogram is composed of a very high number of individual values. This means that there are a great number of ways for an explanation mask to act on the classification results of the machine learning model in the anomaly detection module. In order to create an explanation mask which results in greater clarity, however, the structure should be as simple and consistent as possible. For this, a certain freedom is assumed in creating the explanation mask in that an explanation mask that is smaller than the spectrogram that is to be explained is used initially. An explanation mask with the same dimensions as the original spectrogram is first generated via a deterministic upsampling.

According to another aspect of the invention, the system comprises:

a data input module, which receives the sensor data or ranges of sensor data processed by the anomaly detection module, the machine learning model, which the anomaly detection module uses on the sensor data or ranges of sensor data, and the anomalies predicted by the machine learning model;

an evaluation module, which acquires the data and the machine learning model acquired by the data input module and generates the explanation output on the basis thereof, wherein the evaluation module comprises a first transmitter module, which transmits the explanation output to a user;

a memory module that comprises a receiver module, which receives an evaluation of the predicted anomaly as a correctly or incorrectly predicted anomaly from the user based on the explanation output, wherein the memory module receives and stores the data acquired from the data input module and the received machine learning model, the explanation output generated by the evaluation module, and the evaluation received by the receiver module;

a second transmitter module, which transmits the evaluation of the predicted anomaly by the user as a correctly or incorrectly predicted anomaly to the anomaly detection module in order to improve the machine learning model.

The data input module can be a data interface between the anomaly detection module and the system. In a cloudified embodiment, in which the system is executed in a cloud, the data interface is a wireless interface, for example. Because the system acquires the machine learning model from the anomaly detection module via the data input module, the system can optimize the explanation mask locally in an iterative manner, e.g. in the cloud, or using the evaluation module in the system. It is then no longer necessary to exchange any data with the anomaly detection module during the optimization. This reduces computing time.

According to another aspect of the invention, the data input module is configured to check the data acquired by the anomaly detection module for validity. If, for example, the data type "floating-point number" is defined for the sensor data, the data input module checks whether the acquired sensor data are in the form of floating-point numbers. Metadata can be in another data format. Based on this check, the data are then corrected at this point as much as possible, or an operator is informed of the problem, and further processing is halted until the required rectification is made, according to another aspect of the invention.

The evaluation module corresponds to an explanation generator and can comprise hardware accelerators that are configured to optimize the explanation mask. By way of example, the evaluation module can comprise one or more graphics processing units. The evaluation module comprises numerous submodules according to one aspect of the invention, e.g. four submodules, e.g. a first submodule for the explanation calculation, a second submodule for a similarity calculation, a third submodule for an explanation conversion, and a fourth submodule for preparing the explanation output. The first submodule optimizes the explanation mask. The second submodule compares current anomalies that are to be evaluated with anomalies that have already be evaluated via data exchange with the memory module. The third submodule can convert the explanation output into a corresponding data domain in order to further help the user in the evaluation. The fourth submodule prepares the explanation output for a visual or audio rendering.

The memory module is a cloud storage according to one aspect of the invention.

According to another aspect of the invention, the system is configured to compare a currently predicted anomaly in sensor data or range of sensor data for this current anomaly with sensor data in a predicted anomaly stored in a memory module in the system, compare an explanation output for this current anomaly with explanation outputs for predicted anomalies stored in the memory module, and/or compare a combination of the sensor data and the explanation output, in each case for this current anomaly, with a corresponding combination of predicted anomalies, in the explanation. The system is configured to obtain the comparison with an algorithm in which distances are incorporated. The comparison thus take place at three levels. This ensures that structural similarities are found between basic measurements, as well as between error patterns, and lastly between actual similar products/components, which have resulted in different measurements during the production due to errors.

By way of example, the comparison or algorithm is carried out by the second submodule for a similarity calculation. The algorithm can make the comparison on the basis of a simple distance, e.g. a Euclidean distance. According to one aspect of the invention, the algorithm applies a cosine similarity analysis to auto-encoder embeddings.

The cosine similarity, or cosine distance, is a measure for the similarity between two vectors. The cosine of the angle between the two vectors is determined for this. The cosine similarity is advantageous when comparing data, in particular with regard to semantic correlations. According to one aspect of the invention, the algorithm is the latent semantic analysis algorithm disclosed in U.S. Pat. No. 4,839,853, in which a query regarding cosine similarity can be compared with a file or a document.

In order to classify a questionable anomaly in the context of the already reviewed potential anomalies, as a rule, the system displays the three most similar previous reviewed anomalies, according to one aspect of the invention. This ensures that an inspector can work efficiently, and that a certain consistency is obtained in the evaluations. If the inspector is shown the previously evaluated anomalies, it is then possible to subsequently change the assessment when new findings arise. By way of example, findings regarding components can be entered, in which an anomaly has been detected by the system, and then examined more closely in a laboratory in order to identify the problem.

According to another aspect of the invention, the system is configured to render initial sensor data in another data domain, and generate the explanation output in this data domain. By way of example, the display can take place in another data domain by means of the third submodule for an explanation conversion. This results in an important source of information for assessing and explaining potential anomalies. If the original signal on which the anomaly detection worked was a vibration/time signal, such as an acoustic signal, the explanation will also be in this form. The system also allows the inspector to see this signal in a frequency domain, e.g. through a Fourier transform. This allows the inspector to visually observe and assess an acoustic signal. It is also possible to convert a frequency signal into an acoustic signal, in order to listen to the abnormal sound.

If a conversion of an original signal to another data domain does not provide results, strategies are implemented in the system according to another aspect of the invention to deal with this. First, standard values that have worked well in the past for a specific problem can be assumed by the system. This can be a single value for an open parameter as well as an entire selection, wherein the inspector subsequently has the possibility of selecting the most useful result. It may also be possible to make use of a similarity calculation. If a parameter is insufficient in an explanation conversion, the free parameters can be given those values that have provided good results in similar explanations and source data.

According to another aspect of the invention, the system is configured to scan sensor data, ranges of sensor data, or values derived therefrom that are responsible for the anomalies predicted by the anomaly detection module, at a higher frequency. This further improves the data recording. By way of example, the system can recommend, e.g. in a container format or metafile, that particularly relevant ranges be scanned at a higher frequency.

The invention shall be explained in greater detail below in reference to the drawings of exemplary embodiments.

BRIEF DESCRIPTION OF THE DRAWINGS

FIG. 5a shows an exemplary embodiment of initial sensor data in the form of a spectrogram;

FIG. 5b shows exemplary values of the spectrogram shown in FIG. 5a;

FIG. 5c shows an exemplary embodiment of an initial explanation mask;

FIG. 6a shows the spectrogram from FIG. 5a;

FIG. 6b shows an exemplary embodiment of an optimized explanation mask;

FIG. 6c shows an exemplary embodiment of a graphic rendering of an explanation output;

DETAILED DESCRIPTION

Figure 1:
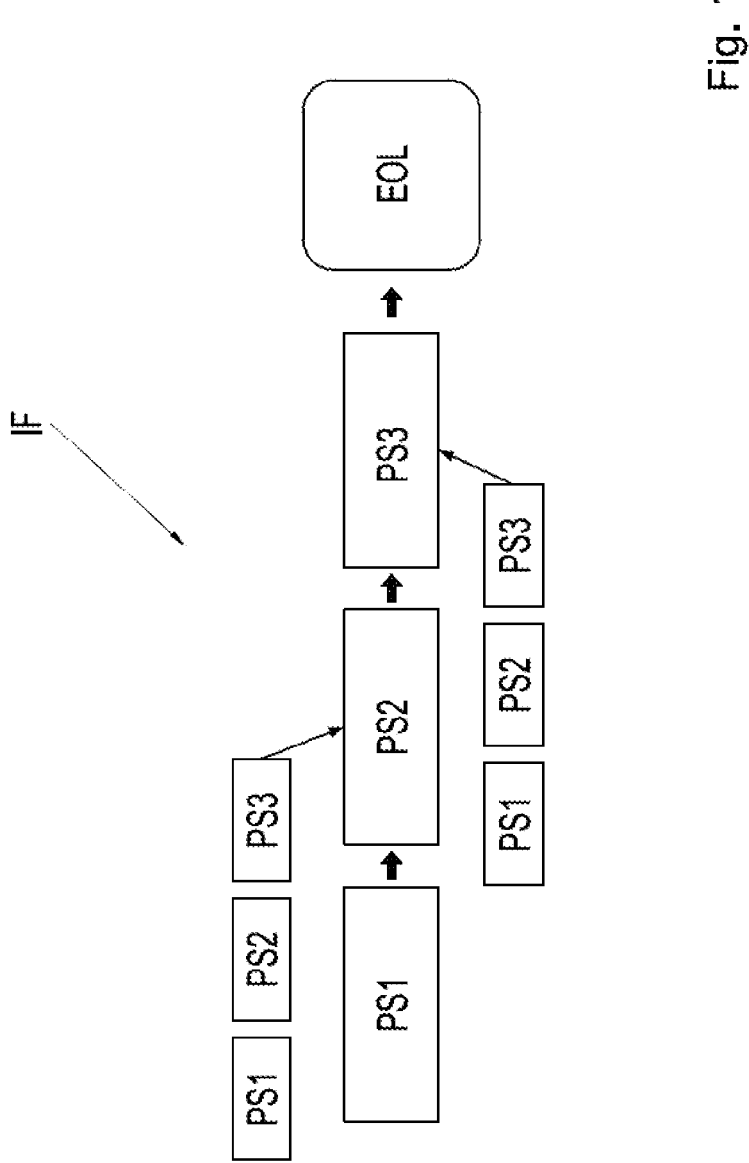
FIG. 1 shows a schematic illustration of an exemplary embodiment of an industrial production process.

Identical reference symbols in the drawings refer to the same or functionally similar parts. For purposes of clarity, only those parts that are relevant are given reference symbols in the drawings.

Industrial production processes are normally broken down into so-called assembly lines, which in turn are broken down into separate production steps PS. An assembly line has a specific production capacity, e.g. 100 products/day. A scaling of the production can be obtained by using numerous identical assembly lines which each produce the same product. In addition to a main assembly line, there are also secondary assembly lines in which individual components of the main product are produced. Each production step PS can address a different aspect of the production, e.g. assembly, milling, or quality control. FIG. 1 shows an industrial production process IF comprising a main assembly line and two secondary assembly lines. The main assembly line comprises production steps PS1, PS2, PS3. One of the secondary assembly lines also comprises three production steps PS1, PS2, PS3, for example, and relates to the production step PS2 in the main assembly line. The other secondary assembly line also comprises three production steps PS1, PS2, PS3, and relates to the production step PS3 in the main assembly line, by way of example. A final testing is carried out at the end of the main assembly line EOL.

Figure 2:
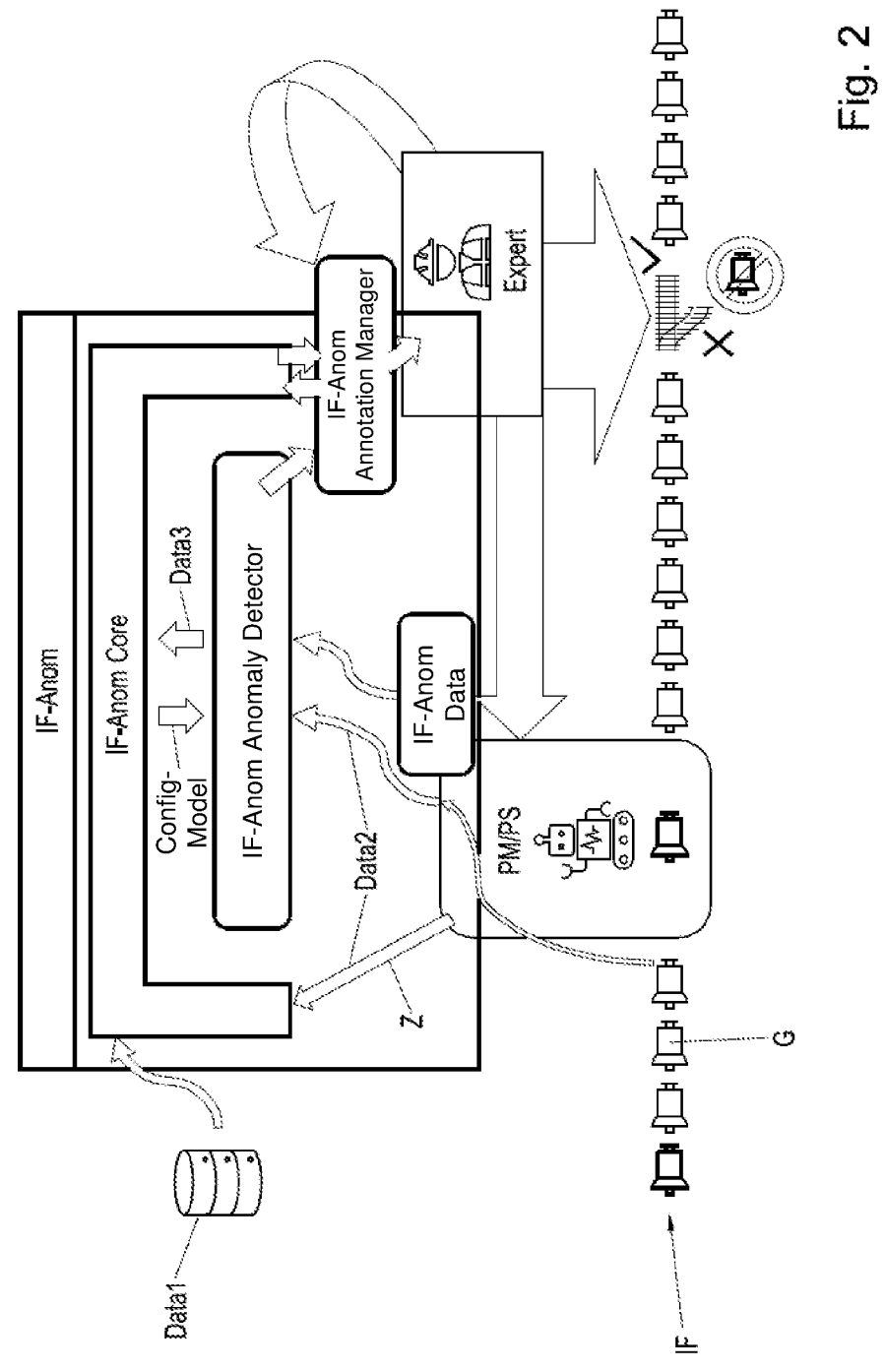
FIG. 2 shows a first exemplary embodiment of an anomaly detection module.

The anomaly detection module IF-Anom monitors the production steps PS, PS1, PS2, PS3 and/or the respective associated production machines PM with regard to anomalies, see FIG. 2.

The anomaly detection module IF-Anom integrates the following steps or modules: data-based definitions of a state Z of the process that is to be monitored, storage and processing of all necessary data, training anomaly detection on the basis of historical data Data1, integration of an inspector Expert for checking detected/predicted anomalies, and for generating further annotations for a targeted expansion of the training database Data1, detection/prediction of anomalies, processing the evaluation of the inspector Expert, and continuous adjustment and improvement of the anomaly detection on the basis thereof.

The fundamental functionalities, such as storing and expanding the database, establishing configurations of trained models Config-Model, and querying annotations for expanding the fundamental data, are assumed in this case by a first module IF-Anom Core.

The task of detecting/predicting anomalies is carried out by a second module IF-Anom Anomaly Detector. The data and/or inspection results corresponding to the defined state Z For the production steps PS or production machines PM that are to be monitored are continuously sent to IF-Anom for this. The response from IF-Anom then contains a classification of the state Z as either "normal" or "abnormal," and may also contain a confidence estimation, and is then sent by a third module IF-Anom Annotation Manager to an inspector Expert for inspection.

The extent to which the proposals from the IF-Anom are actually inspected by an inspector Expert depends on the application as well as the progress level of the training reached by the IF-Anom, i.e. how high the precision of the estimations by the IF-Anom can be expected to be.

The anomaly detection module IF-Anom has the possibility of integrating other data sources in a production step PS in the form of an additional fourth module, IF-Anom Data. This can be an additional vibration sensor, for example, coupled to a special stimulus. The data generated in this manner can be sent to the anomaly detection module IF-Anom during operation, and serve as another data source for training the model after enough data have been generated.

The model can be trained with the following method, for example, which is implemented by a computer:

obtaining data Data1, Data 2 for states Z of a process, a component, and/or a product machine PM, in at least one process step PS, PS1, PS2, PS3 that is to be monitored in an industrial production process IF at a predefined point in time or during a predefined time interval, from identical process steps and/or from downstream processes comprising data from sensors and/or data acquired by simulating the process;

determining a state definition on the basis of the data Data1, Data2;

storing the data and the state definition;

training at least one machine learning model ISA2 for anomaly detection, wherein the data Data1, Data2 are entered in the machine learning model ISA2, and the machine learning model ISA2 divides up the states Z on the basis of the state definition, and based on this division, those states Z that are rare and/or differ from other states Z, based on the data Data1, Data2, are classified as anomalies;

evaluating the trained machine learning model, wherein an inspector Expert annotates true positive results and/ or false positive results among the classified anomalies;

expanding the data Data1, Data2 with the annotations and storing the expanded data;

storing the trained machine learning model ISA2 and its evaluation.

The scenario 1 illustrated in FIG. 2 could relate to a malfunctioning production machine PM, for example. In the known prior art, repairs are first carried out in this case, after the production machine PM has broken down, thus resulting in the expense of halting production. If the production machine PM does not break down immediately, production of defective components may go unnoticed, which are then further processed and may result in problems in downstream production steps PS, PS1, PS2, PS3, or products.

In FIG. 2, the interference in the industrial production process IF and/or the inspection with sensors S and the corresponding availability of data Data2 offers the possibility of recording data regarding the state Z of a production step PS, PS1, PS2, PS3, or an inspection in an intelligent anomaly detection module IF-Anom and/or its respective modules IF-Anom Core, IF-Anom Anomaly detector, IF-Anom Annotation Manager using artificial intelligence AI, and to consequently detect and report abnormal behavior.

This enables an early reaction to changes, ideally before a process breaks down, or a defective component is allowed into the process chain, and results in a better identification of the cause of the problem.

The anomaly detection module IF-Anom monitors, for example, a production step PS or a production machine PM in FIG. 2. This can be a lathe, for example, which processes a component, or a machine with which an operator assembles a component. The sequence executed by the anomaly detection module IF-Anom is as follows:

After it has been established what the process step is that is to be monitored, the relevant database Data2 is appraised. A definition of the state Z that is to be monitored is then determined on the basis of the data. The initial training data Data1 are then selected for the anomaly detection module IF-Anom.

The main source of data for the training data Data1 is normally composed of historical data for the process in question, and the upstream processes, if these are relevant in the evaluation of the state Z. This can be geometric data for the components involved in the process, for example. Data from comparable processes can also be drawn on, thus forming a second source of training data Data1, e.g. if insufficient data is available for the process that is to be monitored. A third source of training data Data1 can comprise synthetic, simulated data. In this case, the data is generated synthetically, or simulated, e.g. using a physical model of the process in question.

A transfer learning process can be used to acquire the second and third types of training data Data1. The processing of the data Data1, Data2 and the model training is assumed by the first module IF-Anom Core.

While the anomaly detection module IF-Anom is in operation, data Data2 obtained from the monitored process are continuously sent to the second module IF-Anom Anomaly Detector. The second module IF-Anom Anomaly Detector acquires the current models from the first module IF-Anom Core, as well as an application-specific configuration Config-Model, in which the necessary preprocessing of the arriving data Data2 is specified. Using this model, an evaluation of the current state Z is then carried out by the second module IF-Anom Anomaly Detector.

This evaluation is sent to the third module IF-Anom Annotation Manager. The third module IF-Anom Annotation Manager assumes the task of deciding whether and when a state Z is to be given for assessment to an, or which, inspector Expert. Basically, detected anomalies are almost always sent to a user for purposes of comparison, in some cases along with examples regarded as normal. The evaluations by the inspectors Expert are then returned to the third module IF-Anom Annotation Manager, which decides how the annotations are to be returned to the first module IF-Anom Core, in order to expand the database there accordingly. Ideally, the third module IF-Anom Annotation Manager can access metadata regarding the evaluation for this, e.g. an anonymized, if necessary for data protection reasons, identification of the inspector making the assessment, and a time stamp indicating when the assessment was made. The third module IF-Anom Annotation Manager shall be explained in greater detail below.

In order to expand the database, the data sent to the second module IF-Anom Anomaly Detector are then sent to the first module IF-Anom Core for processing and storage. The first module IF-Anom Core assumes the routine retraining or continuing education of machine learning models ISA2. The first module IF-Anom Core can also send annotation queries to the third module IF-Anom Annotation Manager for this.

If a predicted anomaly is confirmed by the inspector Expert, or if the detected anomaly is recognized without an inspection, two possible reactions can be implemented. In the one case, the production step PS that is monitored is examined more closely, based on the state Z identified as abnormal, in order to decide if and when maintenance or repairs need to be carried out. In the second case, the components that are processed during and after the occurrence of the anomaly are rejected and/or examined separately.

One exemplary version of the fourth module IF-Anom Data for additional data acquisition in this scenario is a specially designed test program that generates machine states that do not occur under standard production conditions, but contain a large amount of information regarding the conditions of the components in the production machine PM that is to be monitored.

By way of example, high frequency time signals are often transformed using fast Fourier Transforms or wavelet transforms in the frequency domain. With time signals in general, it may be necessary to synchronize them prior to processing in order to ensure that they can be used for comparison. Other types of data sources, with their own processing steps, may be used to provide image data. These steps are largely dependent on the respective use, but the fundamental concepts of the anomaly detection module IF-Anom described herein remain unaffected.

The time signal is first converted to a spectrogram Sona using a fast Fourier transform. Specific transmission components can be assigned to various ranges within the spectrogram Sona and given limit values that must not be exceeded. On the basis of these ranges, so-called features, and the associated limit values, the state Z of a transmission G is determined as "In Order" if none of the limit values are exceeded, and as "Not In Order" if at least one of the limit values is not maintained.

An entry of the amplitude or energy in a spectrogram Sona corresponds to a frequency in a time interval, i.e. a matrix of numerical values W is obtained, in which each column corresponds to a time interval, and each row corresponds to a frequency. The entries in spectrograms Sona are therefore ordered.

The determination of the features and the associated boundaries is a complex process, which is dictated by the construction of the transmission G and experience obtained when in use. This means that there are also always conspicuous transmissions G that are not identified. For this reason, an expansion of the established transmission acoustic testing is obtained through anomaly detection using the anomaly detection module IF-Anom.

One model uses an autoencoder to chart the states Z normally seen in the training data. An autoencoder is a model with a dual neural network architecture. One part of the model learns to generate a low dimensional representation of a state, e.g. a spectrogram Sona, and the second part of the model learns how to reproduce the original state therefrom. Errors are detected more frequently in rarely occurring states than in the majority of the states Z. As a result, this model can be used for anomaly detection.

Figure 3:
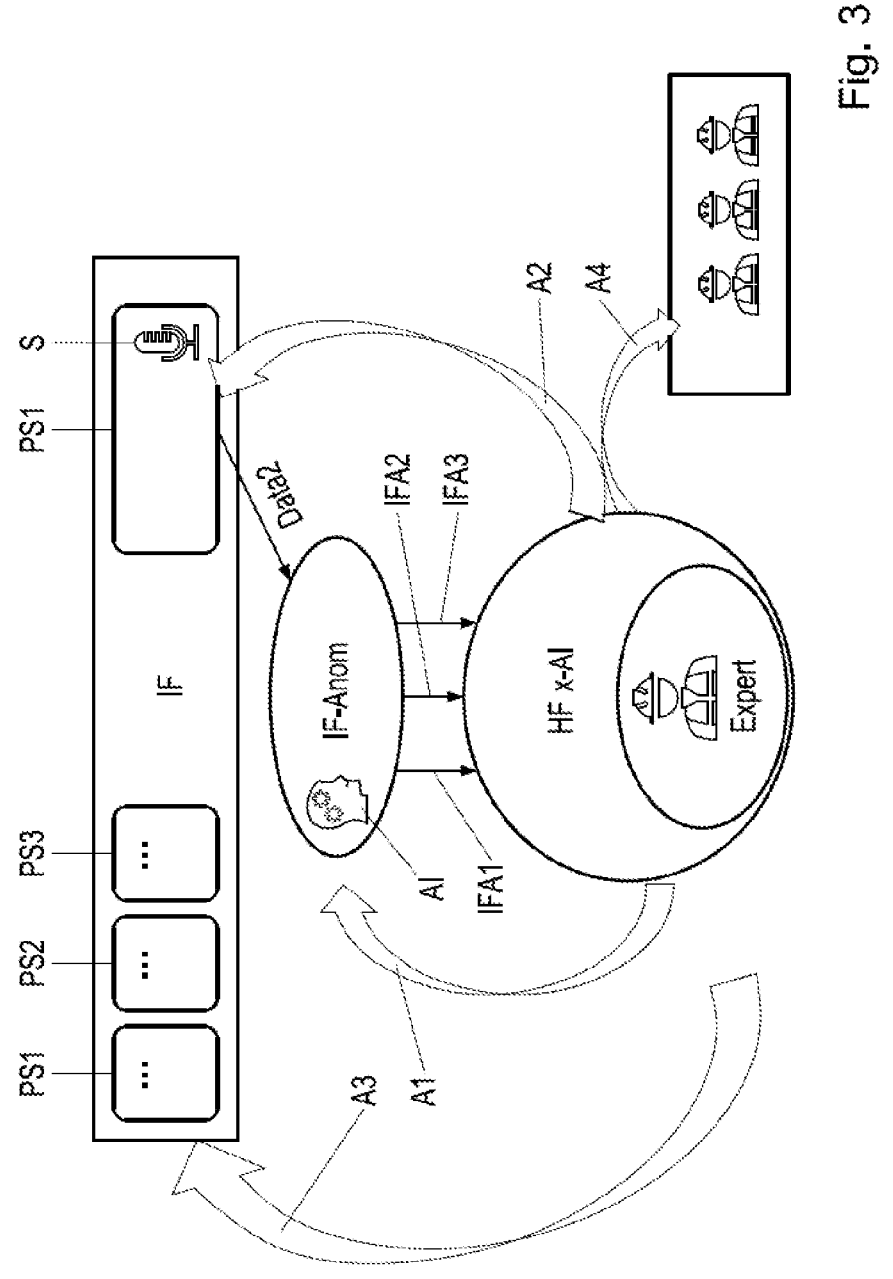
FIG. 3 shows an exemplary embodiment of a system according to various embodiments.

FIG. 3 shows the interaction of the anomaly detection module IF-Anom with the system HF x-AI according to the present disclosure. When HF x-AI is in operation, data is exchanged between the anomaly detection module IF-Anom and HF x-AI. The data that are relevant for the anomaly detection, i.e. the high frequency sensor data Data2 for a process step PS or from product inspection, e.g. vibration measurements for a machine or product component, and meta data that are relevant for the anomaly detection, e.g. material numbers, or machine parameters, are sent through an interface from the respective process step PS to the anomaly detection module IF-Anom. IF-Anom then makes classifications on the basis of this data. These classifications comprise at least normal and abnormal, but they can also be more detailed, such that different types of anomalies can be defined.

The system HF x-AI according to the present disclosure is able to render predictions in a comprehensible form. For this, the anomaly detection module IF-Anom sends the data IFA1 it processes, the AI model ISA2 that is used, and the results of the classification, e.g. a predicted anomaly ISA3, to the system HF x-AI. The system HF x-AI then calculates an explanation output EA from this, which renders the results of the anomaly detection comprehensible for a user Expert. The explanation output EA is often of a visual nature, but is not limited thereto. The explanation output is then sent along with the results of the anomaly detection to an inspector Expert, who validates the results of the anomaly detection, in order to then initiate the appropriate measures.

If a detected anomaly is confirmed, production can be halted, for example, potentially defective parts can be discarded, and the problem can be eliminated on the basis of a root cause analysis in the process step A3. If the detected anomaly is classified as a false prediction, the results of the evaluation can contribute to an improvement in the machine learning model ISA3 in the process step A1. In the process step A2, the evaluation contributes to an improvement in data acquisition. By way of example, data can be obtained at a higher frequency as a result of the evaluation. In process step A4, the user's confidence in the system HF x-AI and/or the anomaly detection module IF-Anom is increased, e.g. in a prototypical operation of the anomaly detection, in that it is demonstrated that the anomaly prediction is based on relevant aspects of the data.

Figure 4:
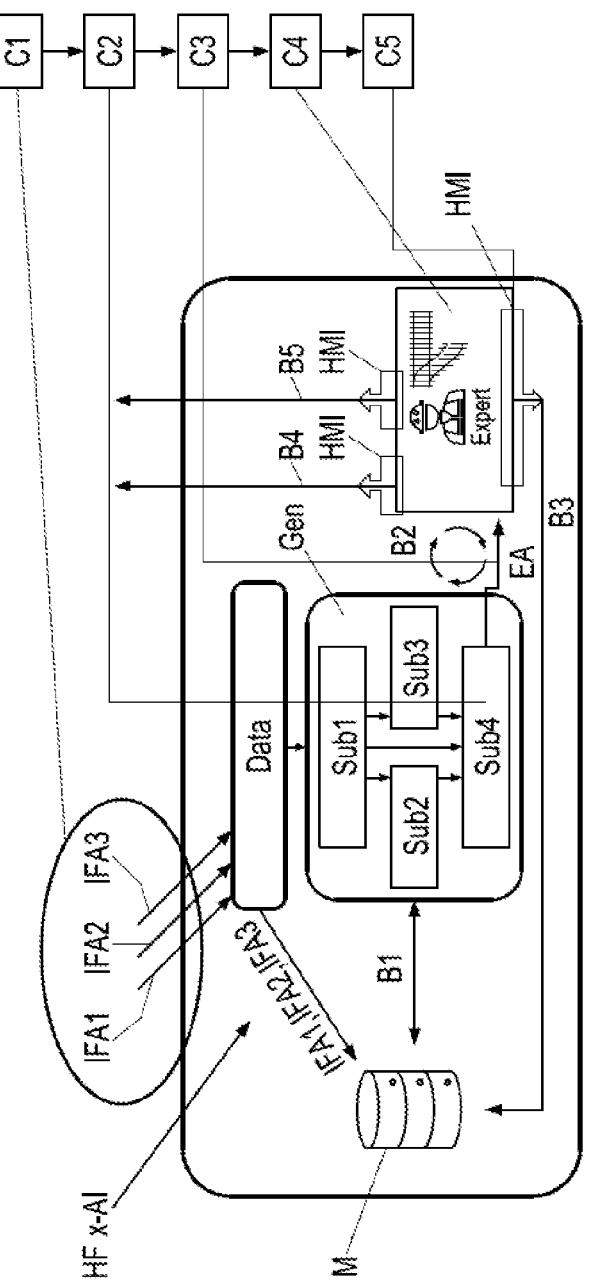
FIG. 4 shows a detailed view of the system shown in FIG. 3, and shows an exemplary embodiment of a method according to various embodiments for monitoring an artificial intelligence-based anomaly detection in high frequency sensor data or values derived therefrom in an industrial production process.

FIG. 4 shows the system HF x-AI. The data ISA1, ISA2, ISA3 sent from the anomaly detection module IF-Anom to the system HF x-AI first end up in a data input module Data. The validity of the data ISA1, ISA2, ISA3, e.g. regarding the type of data, is checked there. Based on this check, the data is corrected as much as possible at this point, or a report is sent to an operator in which the problem is presented, and further processing is put on hold until the requested rectification is obtained.

The data ISA1, ISA2, ISA3 are then sent to a memory module Mem, and to the explanation generator Gen, where the explanation output EA is generated. The explanation generator Gen comprises four submodule Sub1-Sub4, by way of example, which are described in brief below, and in greater detail in the next section. One of the modules Sub1 calculates the explanation, another module Sub4 generates the explanation output EA that can be processed by a user, and two other modules Sub2, Sub3 expand on the explanation. The calculated explanation output EA is sent to the memory module Mem, and added there to the input data ISA1, ISA2, ISA3.

The explanation output EA is sent to an inspector Expert. The inspector Expert has the necessary knowledge to be able to make an accurate classification of the potential anomalies. The inspector Expert uses the explanation output EA to determine whether the classification by the anomaly detection module IF-Anom is right or wrong. To ensure that the explanation is accurate, the inspector Expert can manually refine the calculation of the explanation in an iterative process by adjusting various parameters in the process step B2. The final classification of the potential anomaly is input to a user interface HMI and sent to the memory module Mem in process step B3, such that a complete dataset is obtained there with regard to the anomaly and its evaluation. The parameters used for the final explanation are stored by the explanation generator Gen and used as the standard for future explanations. Measures are then introduced with regard to the production process based on the classification by the user if an anomaly is confirmed.

The evaluation by the inspector Expert, in particular the classification, is returned to the AI model for the improvement thereof in the process step B4. In process step B5, the classification by the inspector Expert is returned to the corresponding processes in the industrial production process IF such that it can better deal with anomalies. A data exchange between the explanation generator Gen and the memory module Mem takes place in process step B1, e.g. for a similarity calculation based on a comparison of currently predicted anomalies IFA3 with the historically predicted anomalies IFA3 and the respective associated data stored in the memory module Mem.

The sensor data IFA1 processed by the anomaly detection module IF-Anom in FIG. 4, for which the machine learning model IFA2 in the anomaly detection module IF-Anom predicted an anomaly, the machine learning model IFA2, and the predicted anomaly IFA3 are obtained in the process step C1 shown in FIG. 4. The explanation output EA for the predicted anomaly IFA3 is generated in process step C2. The explanation output EA is sent to the inspector Expert in process step C3. The predicted anomaly IFA3 is evaluated by the inspector as a correctly or incorrectly predicted anomaly IFA3 in process step C4, based on the explanation output EA. The evaluation is sent by means of a user interface HMI to the system HF x-AI, the anomaly detection module IF-Anom, and/or a respective production step PS in the industrial production process IF that is affected thereby, in the process step C5.

FIGS. 5a-5c show an example of the calculation of an explanation output EA. The data IFA1 processed by the anomaly detection module IF-Anom are presented in a spectrogram Sona in FIG. 5a. FIG. 5b is an excerpt of the spectrogram Sona, showing that it comprises a matrix composed of time and frequency values W. FIG. 5c shows an explanation mask EM, which has the same dimensions as the spectrogram Sona shown in FIGS. 5a, 5b, and which is initialized with zeros.

FIG. 6b shows an optimized explanation mask EM, which forms the explanation for the abnormal spectrogram Sona shown in FIG. 6a. The spectrogram Sona in FIG. 6a has been classified by the anomaly detection module IF-Anom as abnormal. Based on the initialization, see FIG. 5c, for example, the evaluation module Gen in the system HF x-AI modifies the explanation mask EM iteratively, such that the explanation mask EM converts an initially abnormal spectrogram Sona into a normal spectrogram Sona. In the example shown here, the values W in particular in the upper region of the spectrogram Sona in FIG. 6a must be reduced. FIG. 6c shows the explanation output EA, specifically the visual rendering of the optimized explanation mask from FIG. 6b.

Figures 7A, 7B:
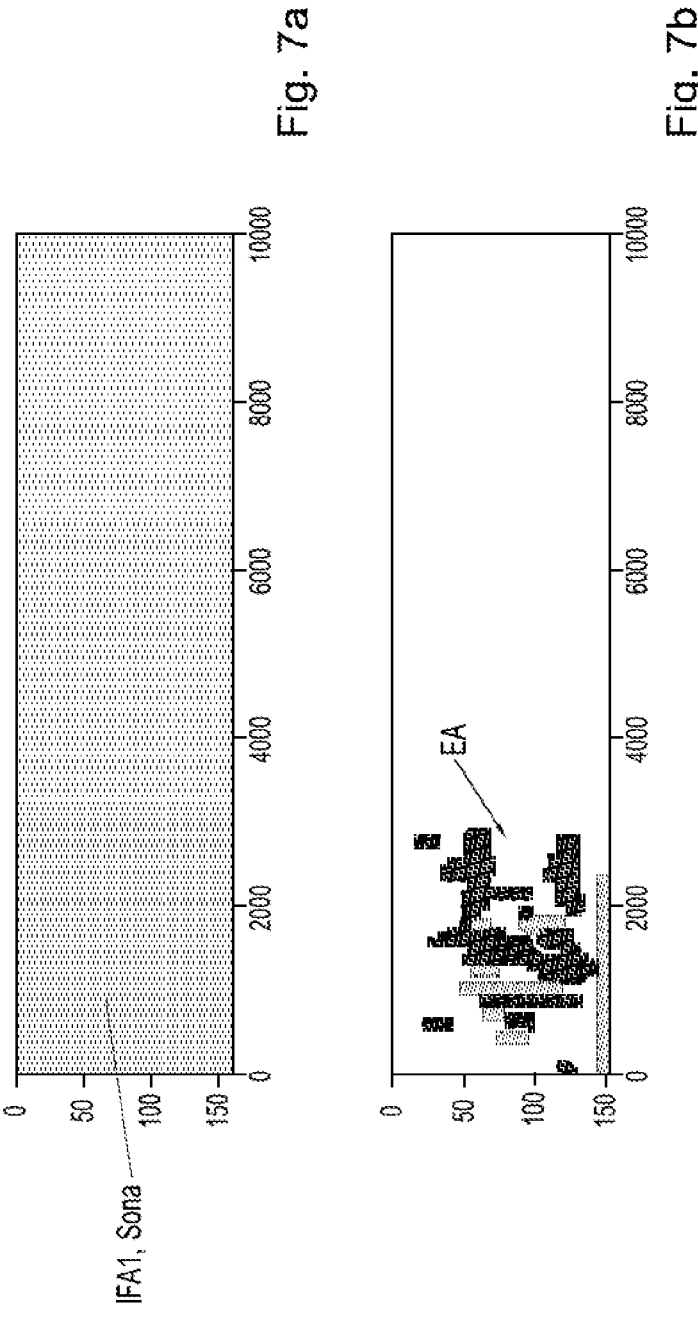
FIG. 7a shows an exemplary embodiment of a spectrogram.
FIG. 7b shows an explanation output for the spectrogram shown in FIG. 7a generated according to various embodiments.

FIG. 7a shows an example of a spectrogram Sona classified as abnormal by the anomaly detection module IF-Anom in a final acoustic testing EOL of a transmission G. FIG. 7b shows the explanation output EA calculated by the system HF x-AL. Dark areas correspond to negative values in the explanation mask EM. Bright areas correspond to positive values in the explanation mask EM.

Whether or not a completed transmission G is working properly is determined in the framework of the final inspection at the end of the assembly line EOL. This inspection involves, by way of example, a functioning and/or acoustic testing. The rotational rate is accelerated in various gear stages in the framework of the acoustic testing, and the resulting structure-borne sound in the transmission housing is measured during this process. This relates to process step D1 in FIG. 8.

Figure 8:
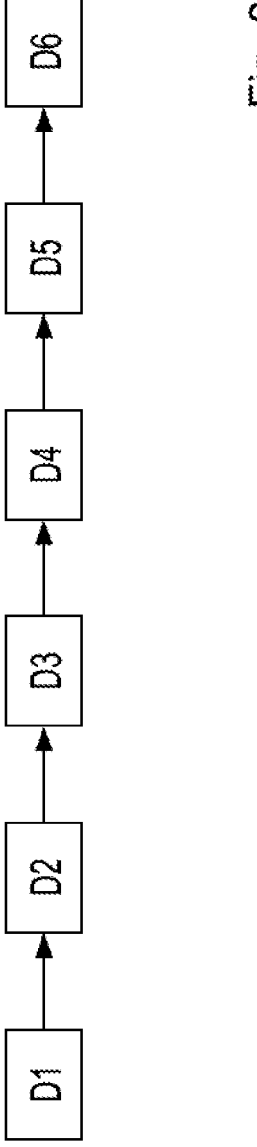
FIG. 8 shows an exemplary embodiment of a method according to various embodiments for monitoring artificial intelligence-based anomaly detection in a final acoustic testing of a transmission at the end of an assembly line.

The established evaluation of the transmission state then takes place by converting the acceleration/time signal into the frequency domain using a fast Fourier transform in process step D2 in FIG. 8, and subsequent application of limit values to specific time/frequency ranges. The result of this inspection is than a classification as either "in order" or "not in order." This corresponds to process step D3 in FIG. 8. Because the established transmission acoustic testing evaluation cannot identify all "not in order" transmissions, an AI-based anomaly detection is carried out on the transmission inspections classified in process step D4 shown in FIG. 8 as "in order." Algorithms are used in convolutional neural networks CNN to detect anomalies for this, the results IFA3 of which are then examined by an inspector Expert.

The CNN works on the spectrogram Sona for the transmission acoustic testing, and classifies the spectrogram Sona as either "normal" or "abnormal." If a transmission G is classified by the CNN as "in order," this classification can be checked by an inspector Expert. To ensure that this inspection can take place in the intended manner, HF x-AI is used to show the regions of the spectrogram Sona to the inspector Expert that are relevant for classification as an anomaly. This relates to the process step D5 shown in FIG. 8.

In this case, the explanation mask EM is added to the original spectrogram Sona, and adjusted under the following boundary conditions such that the sum of the original spectrogram Sona and the explanation mask EM obtained by the CNN is no longer classified as abnormal. The optimization takes place, by way of example, using the gradient descent method. The boundary conditions that are used are:

The sum of the amounts/absolute values of all values W in the explanation mask EM should be as low as possible. As a result, the explanation makes minimal changes and concentrates specifically on the actually relevant regions in the anomaly classification.

The changes between adjacent values W in the explanation mask EM should be as small as possible. As a result, the explanation mask EM favors coherent regions, and thus generates a rendering that can be more easily interpreted by a user Expert.

The changes caused by the explanation mask EM are limited. This means that the sum of the original spectrogram Sona and the explanation mask EM cannot exceed or fall below certain values at the level of each individual value W. This prevents the algorithm from generating explanation masks EM that result in unrealistic spectrograms Sona. The intention here is for the explanation mask EM to remove/detect abnormal structures in the spectrogram, without generating an entirely unrealistic spectrogram Sona.

Further terms of this type may be useful in the optimization, and must be developed on the basis of a specific scenario.

The regions of the spectrogram Sona that are responsible for the predicted anomaly IFA3, based on the explanation mask EM, are then shown to an inspector Expert in the process step D6 shown in FIG. 8.

REFERENCE SYMBOLS

IF industrial production process
PS1-PS3 production steps
PS production step
PM production machine
G transmission
EOL final testing at the end of the assembly line
S sensor
HF x-AI system
EA explanation output
EM explanation mask
HMI user interface
IF-Anom anomaly detection module
IF-Anom Core first module
IF-Anom Anomaly Detector second module
IF-Anom Annotation Manager third module
IF-Anom Data fourth module
Expert inspector/user
IFA1 sensor data processed by the anomaly detection module
IFA2 machine learning model
IFA3 predicted anomaly
Data1 first data
Data2 high frequency sensor data
Data3 third data
Sona spectrogram
Data data input module
Gen evaluation module/explanation generator
Sub1 first submodule for explanation computation
Sub2 second submodule for similarity computation
Sub3 third submodule for explanation conversion
Sub4 fourth submodule for a preparation of the explanation output
Mem memory module
Z state
Config-Model configuration trained model
AI artificial intelligence
CNN convolutional neural network
A1-A4 process steps
B1-B4 process steps
C1-C5 process steps
D1-D6 process steps

The invention claimed is:

1. A system for rendering an explanation output for users regarding an anomaly predicted by an anomaly detection module on a basis of high frequency sensor data or values derived therefrom in an industrial production process, wherein the anomaly detection module predicts the anomalies when the anomaly detection module classifies sensor data or ranges of sensor data that describe a state of a machine, a component, and/or a product of the production process as different from the data that are normally expected, wherein the system comprising graphical processing unit and is configured to:

calculate an explanation for the predicted anomaly based on sensor data or ranges of sensor data processed by the anomaly detection module which uses a machine learning model, wherein the anomaly detection module uses the sensor data or ranges of the sensor data to predict the anomaly;

create an explanation mask for calculating the explanation, wherein the explanation mask alters the sensor data or range of sensor data in which the anomaly was predicted, such that the anomaly detection module classifies the sensor data masked with the explanation mask as normal;

optimize values in the explanation mask through iterative processing of the machine learning model for the respective masked sensor data; and transmit the optimized explanation mask in the form of the explanation output rendered visually for users, wherein the user can identify which sensor data, ranges of sensor data, or values derived therefrom, are responsible for the anomaly predicted by the anomaly detection module, based on the optimized explanation mask.

2. The system according to claim 1, configured to visually render the optimized explanation mask, wherein the optimize explanation mask is a combination of initial sensor data, or values derived therefrom and multiplied or added with the optimized explanation mask; or an adjacent presentation of the initial sensor data or values derived therefrom and the optimized explanation mask, for the user.

3. The system according to claim 1, configured to optimize the values in the explanation mask under the boundary conditions, such that at least one of:

the change to the initial sensor data or values derived therefrom is minimized;

the change to the initial sensor data or values derived therefrom is focused on localized regions of the sensor data;

the change favors coherent regions for the sensor data or values derived therefrom over isolated sensor data; or the changed values lie in a region of observable values that can be expected, or are physically possible.

4. The system according to claim 3, configured to distort initial sensor data or values derived therefrom, and/or the explanation mask with random values.

5. The system according to claim 1, wherein the explanation mask has the same dimensions as the initial sensor data or values derived therefrom, and the system is configured to add the explanation mask iteratively to the initial sensor data or values derived therefrom, and/or to multiply the explanation mask iteratively with initial sensor data or values derived therefrom.

6. The system according to claim 1, wherein the dimensions of the explanation mask is initially smaller than that of the initial sensor data or values derived therefrom, and the system is configured to determine an explanation mask using up sampling, which has the same dimensions as the initial sensor data or values derived therefrom.

7. The system according to claim 1, comprising a data input module which acquires the sensor data or range of sensor data processed by the anomaly detection module, the machine learning model used by the anomaly detection module on the sensor data or ranges of sensor data, and the anomaly predicted by the machine learning model;

an evaluation module, which acquires the data obtained from the data input module, and the machine learning model that was obtained, and generates the explanation output on the basis thereof, wherein the evaluation module comprises a first transmitter module, which sends the explanation output to the user;

a memory module that comprises a receiver module, which receives an evaluation of the predicted anomaly made by the user based on the explanation output as a correctly or incorrectly predicted anomaly, wherein the memory module receives and stores the data obtained from the data input module, and the machine learning model that was obtained, the explanation output generated by the evaluation module, and the evaluation received from the receiver module; and a second transmitter module, which sends the evaluation of the predicted anomaly made by the user as a correctly or incorrectly predicted anomaly to the anomaly detection module in order to improve the machine learning model.

8. The system according to claim 1, configured to compare a currently predicted anomaly in sensor data or ranges of sensor data for this current anomaly with sensor data for predicted anomalies stored in a memory module in the system, compare an explanation output for this current anomaly with the explanation outputs for predicted anomalies stored in the memory module, and/or compare a combination comprising the sensor data and the explanation mask for this current anomaly with a corresponding combination of predicted anomalies stored in the memory module in the explanation, wherein the system is configured to determine the comparison by executing an algorithm in which distances are implemented.

9. The system according to claim 1, configured to render initial sensor data in another data domain, and generate the explanation output in this data domain.

10. The system according to claim 1, configured to initiate scanning at a higher frequency for the sensor data, ranges of sensor data, or values derived therefrom, which are responsible for the anomaly predicted by the anomaly detection module.

11. The system according to claim 1, wherein the system is used during development of a model for an anomaly detection module, wherein it is ensured, on the basis of an explanation output from the system in a training process for a machine learning model used in the anomaly detection module, that no false, random, or irrelevant aspects of training data are learned.

* * * * *